United States Patent
Hansen

(10) Patent No.: US 9,334,698 B2
(45) Date of Patent: May 10, 2016

(54) DRILL ROD SHOCK TOOL

(75) Inventor: Sheldon Hansen, Herriman, UT (US)

(73) Assignee: Utah Valley University, Orem, UT (US)

( * ) Notice: Subject to any disclaimer, the term of this patent is extended or adjusted under 35 U.S.C. 154(b) by 719 days.

(21) Appl. No.: 13/536,591

(22) Filed: Jun. 28, 2012

(65) Prior Publication Data

US 2013/0000983 A1 Jan. 3, 2013

Related U.S. Application Data

(60) Provisional application No. 61/502,069, filed on Jun. 28, 2011.

(51) Int. Cl.
*E21B 17/07* (2006.01)
*E21B 47/01* (2012.01)
*F16F 1/40* (2006.01)

(52) U.S. Cl.
CPC ............. *E21B 17/073* (2013.01); *E21B 47/011* (2013.01); *F16F 1/40* (2013.01)

(58) Field of Classification Search
CPC ....... E21B 17/07; E21B 17/073; E21B 47/01; E21B 47/011; F16F 1/40; F16F 1/403; F16F 1/406
USPC ............................................... 267/141, 141.1
See application file for complete search history.

(56) References Cited

U.S. PATENT DOCUMENTS

| | | | |
|---|---|---|---|
| 1,767,350 A | 6/1930 | Crowell | |
| 2,325,132 A | 7/1943 | Haushalter et al. | |
| 2,570,577 A | 10/1951 | Manion | |
| 2,795,398 A | 6/1957 | Ragland | |
| 3,230,740 A | 1/1966 | Fox | |
| 3,301,009 A | 1/1967 | Coulter, Jr. | |
| 3,306,078 A * | 2/1967 | Hughes | 464/20 |
| 3,323,326 A | 6/1967 | Vertson | |
| 3,339,380 A | 9/1967 | Fox | |
| 3,345,832 A | 10/1967 | Bottoms | |
| 3,383,126 A | 5/1968 | Salvatori | |
| 3,406,537 A | 10/1968 | Faulkner, Jr. | |
| 3,858,669 A | 1/1975 | Jeter | |
| 3,884,051 A | 5/1975 | Bottoms | |
| 3,998,443 A | 12/1976 | Webb | |
| 4,162,619 A | 7/1979 | Nixon, Jr. | |
| 4,245,698 A | 1/1981 | Berkowitz et al. | |

(Continued)

OTHER PUBLICATIONS

Dictionary.com Definition; "Flat"; http://dictionary.reference.com/browse/flat?s=t.*

*Primary Examiner* — Blake Michener
*Assistant Examiner* — Christopher Sebesta
(74) *Attorney, Agent, or Firm* — Kenneth E. Horton; Kirton McConkie

(57) ABSTRACT

Shock tools can include a rotary top drive box in threaded connection with an outer tube. A center plate tube can run through the center of the shock tool to provide a pathway for drilling fluid and/or mud to flow to the drill bit. A bottom tube socket box holding head can be attached to the outer tube and the center plate tube can be connected to a bottom drive socket. The bottom tube socket box holds a portion of the bottom drive socket within the outer tube. The center plate tube can be slidably engaged with the rotary top drive box. Multiple compression plates separated by compression pads are located in the tool to dampen the shock load by distributing the load across each of the multiple pads, thereby minimizing the load on any individual pad. This arrangement allows for higher load dampening lower failure rates.

20 Claims, 4 Drawing Sheets

(56) References Cited

U.S. PATENT DOCUMENTS

| | | | |
|---|---|---|---|
| 4,246,765 A | 1/1981 | Zabcik | |
| 4,257,245 A * | 3/1981 | Toelke et al. | 464/20 |
| 4,270,620 A | 6/1981 | Lawrence | |
| 4,387,885 A * | 6/1983 | Bishop et al. | 267/125 |
| 4,630,809 A * | 12/1986 | Duckworth | 267/141.1 |
| 4,693,317 A | 9/1987 | Edwards et al. | |
| 4,781,359 A | 11/1988 | Matus | |
| 5,476,148 A | 12/1995 | LaBonte | |
| 5,613,561 A | 3/1997 | Moriarty | |
| 5,888,616 A | 3/1999 | Ang | |
| 6,402,524 B2 | 6/2002 | Wurm et al. | |
| 8,205,691 B2 * | 6/2012 | Bowar et al. | 175/322 |
| 2010/0181111 A1 * | 7/2010 | Bowar et al. | 175/56 |

* cited by examiner

DRILL ROD SHOCK TOOL

PRIORITY

This application claims priority to U.S. Provisional Patent Application 61/502,069 filed on Jun. 28, 2011, the disclosure of which is hereby incorporated by reference in its entirety.

FIELD

This application relates generally to tools for drill strings and methods of making and using such tools. In particular, this application relates to shock tools for use with drill rods that are used in exploratory and production drilling, as well as methods for making and using such shock tools.

BACKGROUND

In a conventional process used in drilling, an open-faced drill bit is attached to a drill string, which is a series of connected drill rods and tools that are assembled section by section as the drill string moves deeper into a formation during a drilling operation. Whenever a tool or drill rod breaks or is damaged, such as a worn drill bit, the entire drill string is removed out of the hole that has been drilled (the borehole). Each section of the drill rod must be sequentially removed from the borehole, which takes a significant amount of time.

There are many different methods used to drill, including percussion, rotary, sonic, etc., which are used in various situations based on the type of drilling, formation, and equipment. However, every method of drilling causes various stresses on the drill string and tools that lead to failures. Some dampening tools have been used to try to minimize damage to drill strings and tools. However, some of the existing dampening tools have significant disadvantages, particularly, that they tend not to be suitable for various drilling methods and may not be positionable downhole to provide maximum protection from damage near the drill bit. Similarly, existing shock dampening tools are prone to overheating and failure because the shock loads are generally absorbed by one or very few components.

SUMMARY

Embodiments of drill rod shock tools for use in drilling processes, as well as methods for making and using such shock tools, are described in this application. Embodiments of shock tools can include a rotary top drive box in threaded connection with an outer tube. A center plate tube can run through the center of the shock tool to provide a pathway for drilling fluid and/or mud to flow to the drill bit. A bottom tube socket box holding head can be attached to the outer tube and the center plate tube can be connected to a bottom drive socket. The bottom tube socket box holds a portion of the bottom drive socket within the outer tube. The bottom drive socket can slide within the bottom tube socket box with rubber seals preventing drilling fluid from leaking out of the center plate tube.

The center plate tube can be slidably engaged with the rotary top drive box. Rubber seals can prevent drilling fluid from flowing between the center plate tube and the space between the center plate tube and the outer tube. Multiple compression plates separated by rubber compression pads are located in the space between the outer tube and the center plate tube. The multiple compression pads may dampen the shock load by distributing the load across each of the multiple pads, thereby minimizing the load on any individual pad. These arrangements allow for higher load dampening lower failure rates.

BRIEF DESCRIPTION OF THE DRAWINGS

The following description can be better understood in light of Figures, in which.

Figure 1:
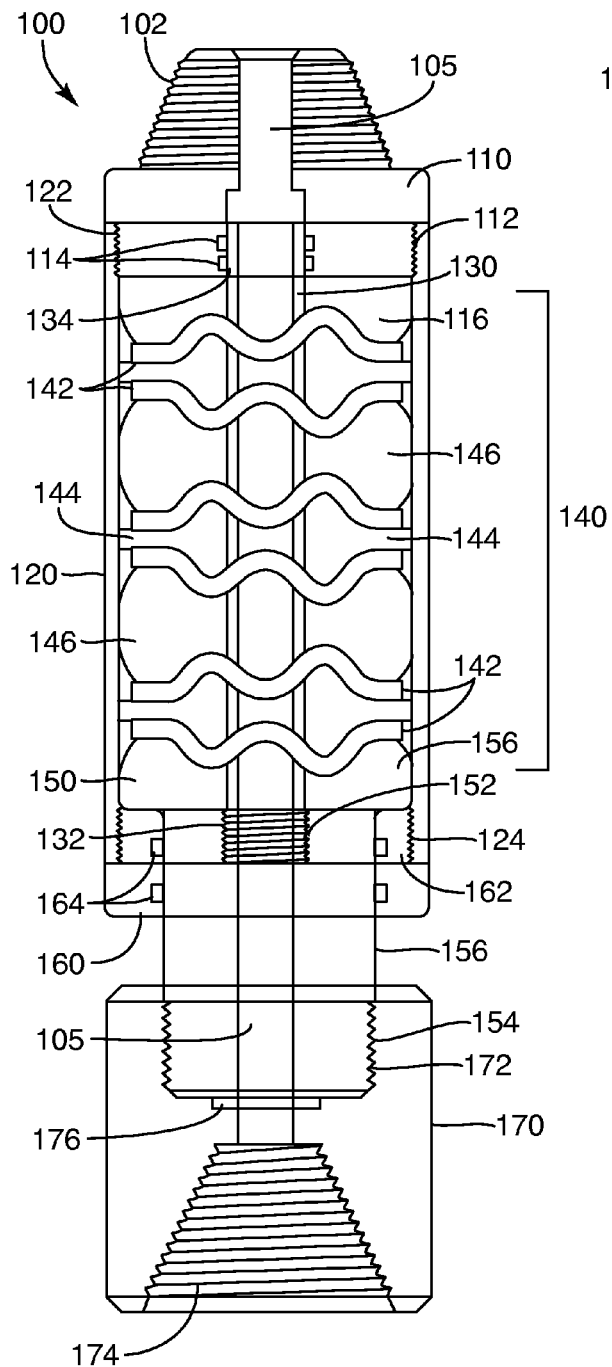
FIG. 1 illustrates an exemplary, cross-sectional view of some embodiments of a shock tool.
Figure 2:
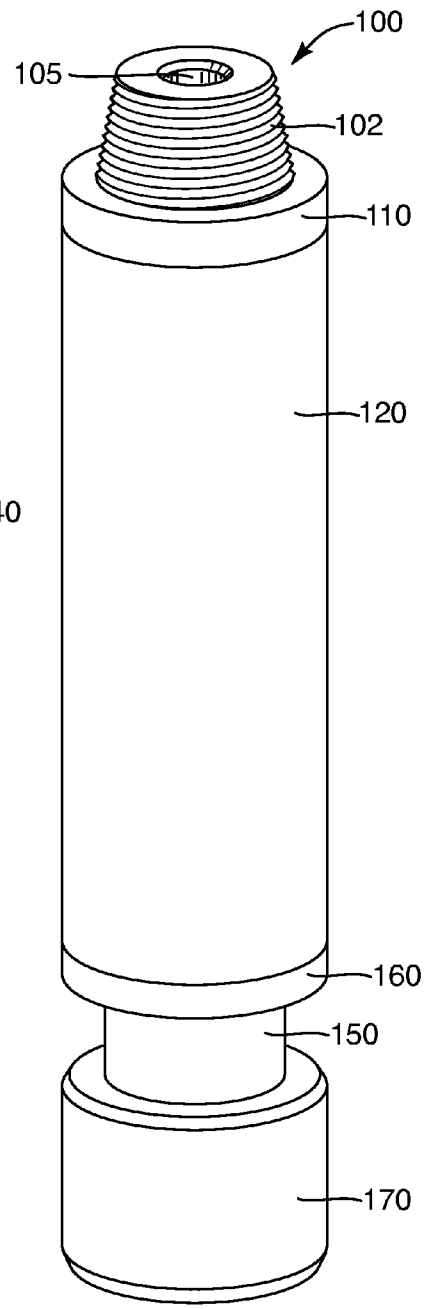
FIG. 2 illustrates a perspective view of some embodiments of a shock tool.
Figure 3:
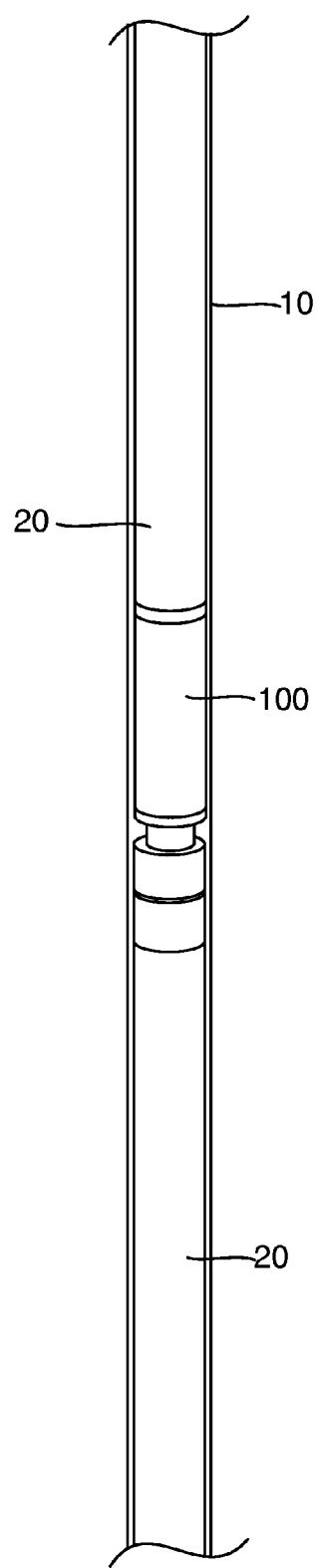
FIG. 3 illustrates view of some embodiments of a shock tool in a drill string.

Together with the following description, the Figures demonstrate and explain the principles of the shock tools and methods for using the shock tools. In the Figures, the thickness and configuration of components may be exaggerated for clarity. The same reference numerals in different Figures represent the same component.

DETAILED DESCRIPTION

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any other apparatus and techniques conventionally used in the industry. For example, while the description below includes examples of rotary drilling, the apparatus and associated methods could be equally applied in other drilling process, such as core drilling, percussive drilling, and exploratory drilling, as well as other drilling procedures and systems. Indeed, the apparatus and associated methods could be used in any type of drilling process where a down hole shock tool to reduce torsional and axial shocks, thereby reducing damage to the drill string components. In some embodiments, the term "drill rod" will be taken to include forms of elongate members used in the drilling, installation and maintenance of bore holes and wells in the ground and will therefore include rods, pipes, tubes and casings which are provided in lengths and are interconnected to be used in a borehole.

The drill string shock tools described in this application can have any configuration consistent with their operation described herein. The shock tools described herein may be placed in a drill string to reduce damage to the drill string components which may occur during drilling operations.

Some configurations of shock tools are illustrated in the Figures as shock tool 100. Shock tool 100 may be designed such that shock tool 100 can be somewhat compressed and rotated to absorb overloading and shocks from the drilling process while still providing transmission of force through drill string to which the shock tool is attached. As such, a lower end of the shock tools can be attached to a drill rod or tool down hole and a top end of the shock tools can be attached to a drill rod or tool upstream of the shock tool without a fixed relationship between the top end and the bottom end of the shock tool, thereby allowing movement between the top end and the bottom end to absorb shocks.

As illustrated in the Figures, some embodiments of a shock tool 100 may include a rotary top drive box 110, a outer tube 120, a center plate tube 130, a bottom drive socket 150, a bottom tube socket box 160, and a lower rotary box end 170. The shock tool 100 may generally be a substantially cylindrical shape with an overall outer diameter similar to the outer diameter of the drill rods in a drill string 20 to which the shock tool 100 may be attached. As assembled, the rotary top drive box 110 at the top end of the shock tool 100 can be in a threaded connection with the outer tube 120. The center plate tube 130 can run through the center of the shock tool 100 to provide a pathway 105 for drilling fluid and/or mud to flow through the shock tool 100 and the drill string 20 to a drill bit at the end of the drill string 20 in a borehole 10.

In these embodiments, the bottom tube socket holding head 160 can be attached to the outer tube 120, and the center plate tube 130 can be connected to the bottom drive socket 150. The tube socket box holding head 150 may be coupled to the lower rotary box end 170, which can be coupled to another downhole tool or section of the drill string 20. The bottom tube socket box 160 can hold a portion of the bottom drive socket 150 within the outer tube 120. The bottom drive socket 150 can slide within the bottom tube socket box 160 with the lower seals 164 preventing any drilling fluid from leaking out of the center plate tube 130 and the pathway 105.

As shown in the Figures, the center plate tube 130 can be slidably engaged with the rotary top drive box 110. The top seals 114, lower seals 164, and gasket 176 can prevent drilling fluid from flowing between the center plate tube 130 and the space between the center plate tube 130 and the outer tube 120, which may house the shock assembly 140. When assembled as described and illustrated, the rotary top drive box 110 can move with respect to the lower rotary box end 170 without coming apart.

As shown in the Figures, the rotary top drive box 110 may include a string connector 102 to connect with a drill string 20. The string connector 102 may be a threaded connection, as shown, or may be any connection for connecting a downhole tool to a drill string. The top rotary drive box 110 may include a portion of a pathway 105, connection threads 112, upper seals 114, and top socket 116. The connection threads 112 may be used to connect the rotary top drive box 110 with the outer tube 120. The upper seals 114 can be located within a slide chamber 118 formed in the rotary top drive box 110 to work with an upper end 134 of the center plate tube 130 to allow some rotary and linear movement between the center plate tube 130 and the rotary top drive box 110, as described herein. The top socket 116 can include various profile features to cooperate with corresponding features of the portions of shock assembly 140, as further described herein.

The outer tube 120 can comprise a hollow tube having generally the same or a smaller outer diameter as the drill string rods. The outer tube 120 can include an upper connector 122 and a lower connector 124. The upper connector 122 may cooperate with the connection threads 112 of the rotary top drive box 110 to fixedly connect the outer tube 120 and the rotary top drive box 110. The lower connector 124 may cooperate with the connection threads 162 of the bottom tube socket box 160 to fixedly connect the outer tube 120 and the bottom tube socket box 160. For each of the various connections, the different components may be threaded together, as illustrated, or may be connected using any method or device. For example, welding, pins, etc. may be used instead of—or in cooperation—the threaded connections to secure the various components of the shock tool 100 together as illustrated and discussed.

The center plate tube 130 may comprise a hollow tube, with the center of the tube forming a portion of the pathway 105 in the drill string 20. The center plate tube 130 may include a tube connector 132 and an upper tube end 134. The tube connector 132 may cooperate with the connection threads 152 of the bottom drive socket 150 to fixedly connect the center plate tube 130 and the bottom drive socket 150. The upper tube end 134 may cooperate with the upper seals 114 and the slide chamber 118 of the rotary top box 110, as discussed herein.

The shock assembly 140 may include multiple compression plates 144, 146 with each compression plate separated by compression pads 142. Each of the compression plates 144, 146 and the compression pads 142 may have a generally annular (i.e., ring) shape. The shock assembly 140 may be located in the space between the outer tube 120 and the center plate tube 130, and between the top socket 116 and the bottom socket 156. Each of the compression plates 144, 146 can have engagement features 147 corresponding to similar features on the top socket 116 and the bottom socket 152. The engagement features 147 may be any shape to permit transmission of the necessary rotational and linear forces through the drill string for drilling.

Figure 4:
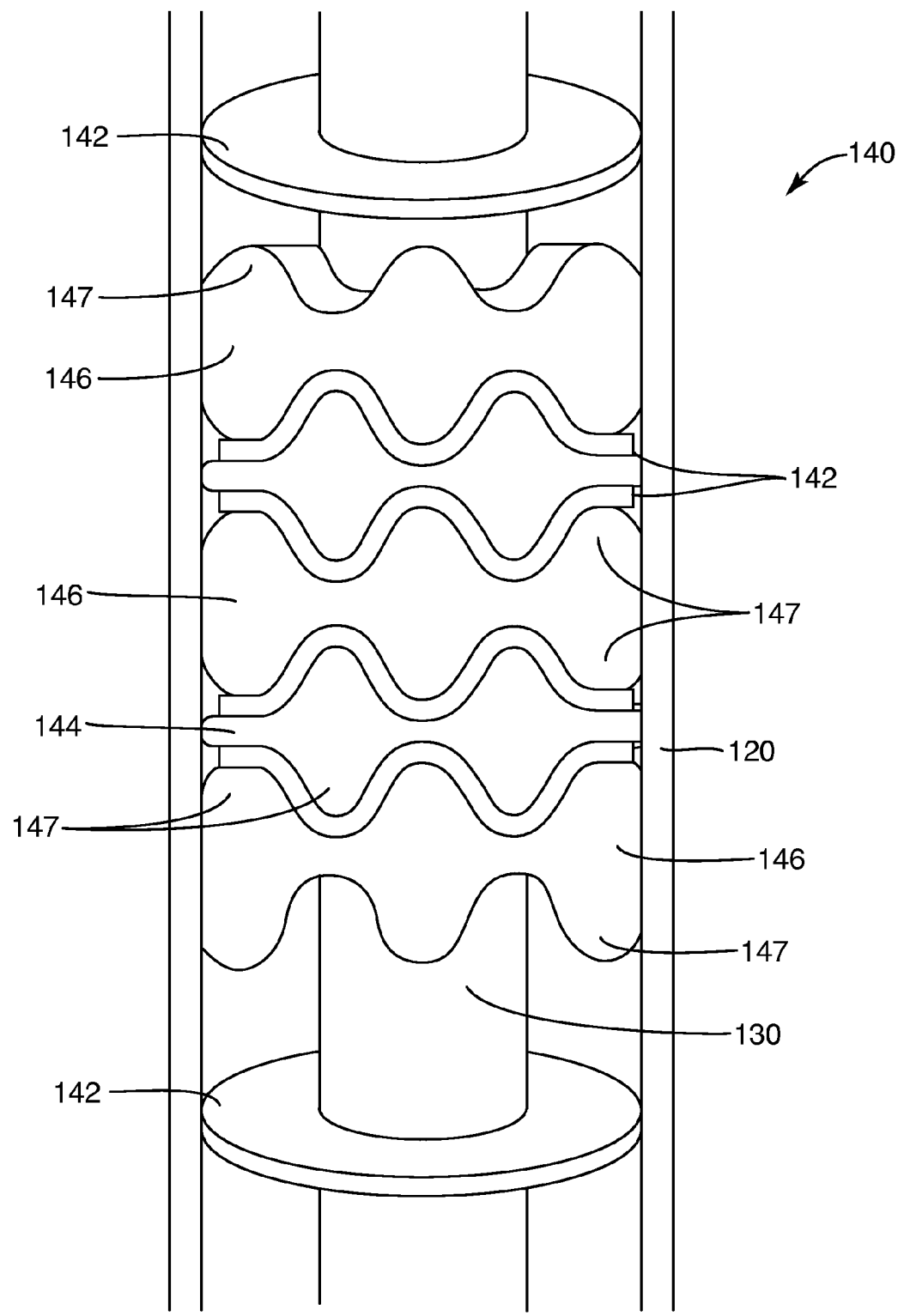
FIG. 4 illustrates a cross-sectional view of a portion of some embodiments of a shock tool.
Figure 5:
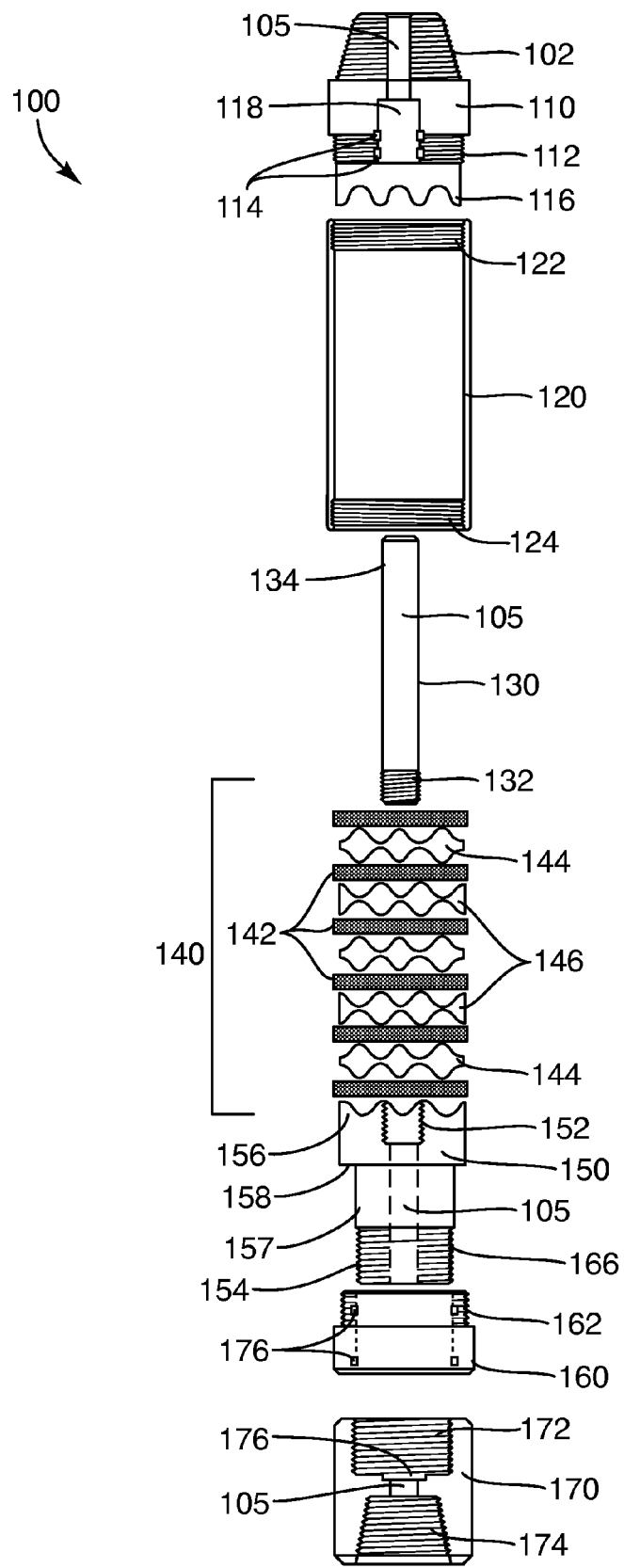
FIG. 5 illustrates an exploded view of the various components of some embodiments of a shock tool.

As illustrated, in some embodiments the engagement features 147 may be wave shapes formed in the compression plates 144, 146. Similarly, the compression pads 142 may be flat and annular (as shown in FIGS. 4 and 5) when not being compressed between the compression plates, such that they deform and conform to the shape of the engagement features 147 when being compressed, as shown in FIGS. 1 and 4.

The wave shapes, or other engagement features, of the compression plates 144, 146 may cooperate with adjacent compression plates (and the bottom socket 156 and the top socket 116) such that the torsion applied to the drill string 20, and thereby to the shock tool 100, can compress the compression pads 142 along the length of each of the multiple compression plates 144, 146 and at various points around each of the compression pads 142, thereby spreading the load across many load points. A torsion shock, such as might happen with a momentary stall of the drill head, may thus be spread across several load points, reducing the critical load on any one point or component. Similarly, an axial shock can compress each of the compression pads 142 to distribute the load across the multiple members to reduce shock load on any particular component. In the illustrated embodiments, five compression plates are shown. In other embodiments, the shock tool may have between 1 and 20 plates, depending on their size, the amount of shock resistance needed, the thickness of the compression pads 142, or other features as desired.

By this arrangement, a shock load applied to the drill string 20 can be effectively dampened by the shock tool 100 without undue stress on any particular component of the shock tool 100 and while effectively transmitting the drilling rotation and linear pressure forces necessary for effective drilling. As well, as the compression pads 142 heat up through repeated compression, the drilling fluid flowing through the center plate tube 130, along with having the multiple compression plates 144, 146 and multiple compression pads 142, may contribute to effectively cooling the compression pads 142 before they become overheated and damaged. Thus, by providing several compression pads and by distributing the compressive forces across multiple surface areas, the wear and heat build up for any one particular compression pad may be reduced significantly when compared to some current shock tool solutions, leading to significant improvements in the wear and lifecycle of the shock tools described herein.

The compression plates 144, 146 may be formed of any material, such as steel, aluminum (incl. aluminum alloys), ceramics, or any other high strength material. Similarly, compression pads 142 may be formed of rubber, neoprene, or any other compressible elastic material which would perform to absorb and then return shock energy, as described herein. Because the compression plates 144, 146 may be formed of metals or other convective materials, the compression plates may transfer heat to the center plate tube 130 and then into the drilling fluid. The movement of the drilling fluid may provide very good convective cooling, as is known in the art of heat exchangers.

In other embodiments, the engagement features may be cooperative offsets, hemispherical protrusions and corresponding pockets, triangle teeth, or any other similar design. In other embodiments, alternating compression plates 144, 146 (and the top socket 116 and the bottom socket 156) may have different, but correspondingly cooperative engagement features. For example, alternating compression plates may have protrusions and the intermediate compression plates between may have holes or depressions cooperative with the protrusions.

The bottom drive socket 150 may contain a bottom socket 156, a middle neck 157, a ledge 158 and connector 152. The middle neck 157 may cooperate with the lower seals 164 in the bottom tube socket box 160 to provide slidable and rotatable movement between the bottom tube socket box 160 and the bottom drive socket 150, as discussed herein. The connector 152 may cooperate with the connection threads 172 of the lower rotary box end 170 to fixedly connect the bottom drive socket 150 and the lower rotary box end 170. As discussed herein, the bottom tube socket box 160 may be fixedly connected to the outer tube 120. The ledge 158 of the bottom drive socket 150 may rest against an upper surface 166 of the bottom tube socket box 160 to trap the upper portion of the bottom drive socket 150 within the outer tube 120. The lower rotary box end 170 may include the connection threads 172 and drill string connector 174. The drill string connector 172 may be similar to the string connector 102 as discussed herein to connect the shock tool 100 to a drill string.

The various components can be sized to accommodate any desired drill string size. Similarly the components can be formed from any suitable materials, such as 4140 Chromium-Molybdenum steel, a section of A53 pipe, etc. As well, the compression plates may be formed with any cooperating shapes to achieve the resulting distribution of shock load and the compression pads can be flat as shown in the Figures, or may be formed in a shape to cooperate with the shapes of the compression plates.

In addition to any previously indicated modification, numerous other variations and alternative arrangements may be devised by those skilled in the art without departing from the spirit and scope of this description, and any claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A shock tool for placement in a drill string, comprising:
   a plurality of compression plates having alternating engagement features with a convex shape so that the convex shape of adjacent compression plates mate together; and
   a plurality of compression pads, each of the plurality of compression plates being separated by a compression pad having a shape different than the plurality of compression plates; and
   wherein when at least one of the plurality of compression pads is compressed between adjacent compression plates, the compression pad deforms to a shape that is mirrored across the central axis of the adjacent compression plates.

2. The shock tool of claim 1, wherein each of the engagement features cooperatively engages with the alternating engagement feature of an adjacent compression plate to allow transmission of rotational force from a drill rod attached to the top of the shock tool to a drill rod attached to the bottom of the shock tool.

3. The shock tool of claim 2, further comprising a top socket configured to be connected to top portion of a drill string and a bottom socket configured to be connected to a bottom portion of the drill string.

4. The shock tool of claim 3, wherein at least one of the top socket and bottom socket includes an engagement feature configured to cooperatively engage with the engagement feature of an adjacent compression plate.

5. The shock tool of claim 3 wherein the top socket and the bottom socket are configured to move axially and rotationally with respect to each other when the shock tool is in use.

6. The shock tool of claim 5, wherein axial and rotational movements of the bottom socket and the top socket with respect to each other are configured to compress at least a portion of each of the compression pads.

7. The shock tool of claim 2, wherein the engagement feature is generally formed in a wave pattern on each of the compression plates.

8. The shock tool of claim 1, further comprising a channel extending through the shock tool.

9. The shock tool of claim 8, wherein the compression plates are annular in shape with the compression plates encircling the channel.

10. The shock tool of claim 1, wherein the compression pad is shorter than the plurality of the compression plates.

11. The shock tool of claim 7, wherein the compression pad is configured to be substantially flat when not compressed between the plurality of compression plates.

12. A method of dampening shock, the method comprising:
    providing a drill string;
    connecting a shock tool to the drill string by using a socket, wherein the shock tool includes a plurality of compression pads and each of the plurality of compression plates having alternating engagement features with a convex shape, wherein the socket includes an engagement feature configured to cooperatively engage with the engagement feature of an adjacent compression plate so that the convex features of adjacent compression plates mate together and wherein when at least one of the plurality of compression pads is compressed between adjacent compression plates, the compression pad deforms to a shape that is mirrored across the central axis of the adjacent compression plates;
    applying a drilling force to the drill string; and transmitting the drilling force across the shock tool, wherein the compression pads dampen changes in the drilling force acting on the drill string.

13. The method of claim 12, wherein the shock tool further includes a plurality of compression plates and the compression pads separate the compression plates from contacting each other.

14. The method of claim 13, wherein the each engagement feature cooperatively engages with the alternating engagement feature of an adjacent compression plate to transmit the drilling force across the shock tool.

15. The method of 14, wherein the drilling force comprises a rotational force.

16. The method of claim 12, further comprising cooling the compression pads with drilling fluid flowing through the drill string.

17. The method of claim 16, wherein the drilling fluid cools the compression pads by passing through a channel in the shock tool, the channel being hydraulically isolated from the compression pads.

18. The method of claim 12, wherein the shock tool comprises a maximum outer diameter substantially similar to the diameter of the drill rods used in the drill string.

19. A drill rod shock tool, comprising:
a drill string; and
a shock tool connected to the drill string using a socket, the shock tool comprising:
a plurality of compression plates with convex features; and
a plurality of compression pads, each of the plurality of compression plates being separated by a compression pad;
wherein the convex features of adjacent compression plates mate together so that when at least one of the plurality of compression pads is compressed between adjacent compression plates, the compression pad deforms to a shape that is mirrored across the central axis of the adjacent compression plates.

20. The drill rod shock tool of claim 19, wherein the compression pad is shorter than the plurality of the compression plates and is configured to be flat when not compressed between the plurality of compression plates.

\* \* \* \* \*